(12) United States Patent
Fernando et al.

(10) Patent No.: US 7,373,709 B2
(45) Date of Patent: May 20, 2008

(54) METHOD OF INSTALLING A BLIND THREADED FASTENER

(75) Inventors: Saman Fernando, Hoppers Crossing (AU); Jianwen Wang, Glen Waverley (AU); Hugh Richard Coleman, Clyde (AU)

(73) Assignee: GEF Holdings Pty Ltd., Braeside (AU)

( * ) Notice: Subject to any disclaimer, the term of this patent is extended or adjusted under 35 U.S.C. 154(b) by 71 days.

(21) Appl. No.: 11/457,874

(22) Filed: Jul. 17, 2006

(65) Prior Publication Data

US 2008/0010805 A1    Jan. 17, 2008

(51) Int. Cl.
*B23P 11/00* (2006.01)
(52) U.S. Cl. ............... 29/525.01; 29/525.02; 29/525.11; 29/243; 29/270; 29/284
(58) Field of Classification Search ............ 29/525.01, 29/525.02, 525.07, 525.11, 242, 243, 243.518, 29/244, 256, 270, 284; 279/76, 82, 145
See application file for complete search history.

(56) References Cited

U.S. PATENT DOCUMENTS 6,145,851 A * 11/2000 Heber .................. 279/143

FOREIGN PATENT DOCUMENTS

WO    WO 00/19113 A1 *   4/2000

\* cited by examiner

*Primary Examiner*—Jermie E. Cozart
(74) *Attorney, Agent, or Firm*—Kirk Hahn (57) ABSTRACT

A method of installing a threaded fastener from one side of a hole through a substrate. The fastener includes a collar and a bolt having a head, a threaded tail portion and a tool engagement portion extending from the tail. The method includes: (a) engaging the tool engagement portion with a bolt engagement portion of a tool (b) passing the bolt through to the far side of the hole and supporting it there by way of the tool, (c) passing the collar through the hole while supporting it with the tool; (d) assembling the bolt and collar to form the threaded fastener having a head larger than the hole; (e) engaging a nut to tighten the fastener; and (f) detaching the tool from the fastener. Separation of the bolt engagement portion and the tool engagement portion is prevented by a moveable member, which engages both portions.

20 Claims, 8 Drawing Sheets

METHOD OF INSTALLING A BLIND THREADED FASTENER

BACKGROUND TO THE INVENTION

This invention concerns the use of threaded fasteners, particularly the field of bolts adapted to be installed entirely from one side of a hole. Such fasteners are commonly referred to as blind bolts.

There is a need for threaded fasteners, particularly in structural steel applications, which can be installed from only one side of a hole so they may be used where the other side of the hole is inaccessible for some reason.

One type of fastener, which can be installed from one side of a hole, includes those commonly called blind bolts. These have evolved over many years and may be suitable for limited structural applications. Examples are described in Australian patent specifications AU-A-67133/90, AU-A-20458/92 and AU-A-20279/95. However a major problem with bolts of that type is that the failure load has a high dispersion and hence the use in structural applications is limited. Also these bolts are relatively expensive to manufacture.

An improved type of fastening system is described in International patent specification WO 00/19113. That system comprises passing a bolt portion of a fastener completely through a hole into which it is being assembled, supporting the fastener on the far side of the hole by means of a tool into which the bolt is screwed, passing a folded collar through the hole and unfolding the collar in order to provide, in conjunction with the head on the bolt portion, a fastener head which is large enough to not pull back through the hole.

While the system described in WO 00/19113 works well, it has now been improved to provide additional advantages. The operation of threading and unthreading the bolt from the tool has been sometimes perceived by users as tedious, and the tool has in some cases been damaged by careless use. Furthermore, the left hand thread provided in the previous invention will not restrain the bolt when undoing the nut hence making it difficult to undo the fasteners. Various aspects of the present invention are intended to provide a fastener, fastening tool and fastening system which overcome these difficulties. The invention may also provide a means whereby a larger diameter collar portion may be passed through the hole.

SUMMARY OF THE INVENTION

In a first aspect the present invention provides a method of installing a threaded fastener from one side of a hole through a substrate, said fastener comprising:
(a) a bolt having:
(i) an enlarged head portion at one end,
(ii) a threaded tail portion at the end opposite said head, and
(iii) a tool engagement portion extending from said threaded tail portion, and
(b) a washer-like collar having an aperture therethrough, said method comprising:
(a) engaging said tool engagement portion with a bolt engagement portion of a tool,
(b) passing said bolt completely through said hole head first from said one side, being the near side of said hole, to the far side of said hole,
(c) supporting said bolt on said far side of said hole by way of said tool which is extending through said hole,
(d) passing said collar completely through said hole while supporting said collar with said tool extending through said aperture and through said hole, said collar being collapsed with portions of said collar lying on respective opposite sides of said tool as said collar is being passed through said hole;
(e) causing said bolt and said collar to assemble to form said threaded fastener having a head larger than said hole on said far side of the hole, a shank within said hole, and portion of said threaded tail on the near side of said hole;
(f) engaging a nut with said threaded tail portion on said near side and rotating said nut to tighten said fastener; and
(g) detaching said tool from said fastener;

wherein said bolt engagement portion and said tool engagement portion engage along an interface, and separation of said bolt engagement portion and said tool engagement portion is prevented by a moveable member, which engages said bolt engagement portion and said tool engagement portion across said interface.

The bolt engagement portion and the tool engagement portion may engage in a sliding fit along an interface aligned axially to said bolt, preferably by way of a protrusion sliding into a socket. Said tool engagement portion may include a recess and said bolt engagement portion include a moveable member which engages into said recess to thereby prevent said separation of said bolt engagement portion and said tool engagement portion.

Said tool engagement portion may comprise a protrusion extending from said threaded tail portion, said bolt engagement portion comprise a socket, and said protrusion and said socket may engage in a sliding fit along an interface aligned in an axial direction relative to said bolt. Preferably said protrusion includes a recess and said bolt engagement portion includes a moveable member which engages into said recess to thereby prevent withdrawal of said protrusion from within said recess.

The moveable member may be manually activated towards said engagement into the recess by means of manually sliding an outer sleeve on said bolt engagement portion. Said moveable member may comprise a stud, preferably round-ended, on a flattened strip. The sleeve preferably prevents said strip from moving radially outwards relative to the threaded tail portion.

Said protrusion preferably has a non-circular cross section so as to prevent rotation of said protrusion in said socket. Said non-circular cross section preferably has a straight portion, such that said protrusion has a flattened face on its periphery. Said non-circular cross section is preferably D-shaped, the rounded portion of which is circular having a centre which lies on the axis of said threaded tail portion, such that said protrusion has a cylindrical face and a flattened face on its periphery. Said recess is preferably formed into said flattened face.

Said moveable member may prevent rotational movement of said protrusion relative to said socket when said moveable member is engaged across said interface.

Said tool preferably has a handle, a shaft attached to the handle, and said bolt engagement portion affixed to one end of said shaft, said shaft including on respective portions of its length:
 a flattened peripheral portion, and
 a flattened diametrically aligned portion located between said flattened peripheral portion and said bolt engagement portion and extending towards said handle to partly overlap with said flattened peripheral portion, and wherein as said collar is passed through said hole, said collar is supported at a first folded portion by said diametrically aligned portion.

Preferably, as said collar is passed through said hole, said collar is folded with portions of said collar lying on respective opposite sides of said diametrically aligned portion, said collar spans said overlap of said flattened peripheral portion and said diametrically aligned portion, and a second folded portion of said collar abuts said flattened peripheral portion.

Said collar preferably comprises two rigid halves joined by flexible hinge portions. Preferably said collar has a boss or other axial protrusion which engages into said hole when said fastener is tensioned.

A washer may be provided between said nut and said substrate such that, as said nut is tightened, a boss on said washer engages into said hole. Alternatively, said nut may have a boss formed thereon such that as said nut is tightened, said boss on said nut engages into said hole. A sleeve may be fitted inside the hole and around the fastener.

In another aspect the invention envisages a bolt comprising:
(i) an enlarged head portion at one end,
(ii) a threaded tail portion at the end opposite said head,
(iii) a major axis running the length of said bolt, and
(iv) a protrusion extending from said threaded tail portion, said protrusion having a non-circular cross section transverse to said axis and having formed into its periphery a recess adapted to receive a moveable member on a tool to thereby prevent withdrawal of said protrusion from the tool.

Preferably, said non-circular cross section has a straight portion, such that said protrusion has a flattened face on its periphery, and said recess is formed in said flattened face. Preferably said non-circular cross section is D-shaped, the rounded portion of which is circular having a centre which lies on said major axis such that said protrusion has a cylindrical face and a flattened face and said recess is formed in said flattened face.

Said recess may be a circular hole but is preferably a slot formed across said flattened face.

BRIEF DESCRIPTION OF THE DRAWINGS

Examples of the invention will now be described with reference to the attached drawings.

DETAILED DESCRIPTION OF THE PREFERRED EMBODIMENTS

Figure 11:
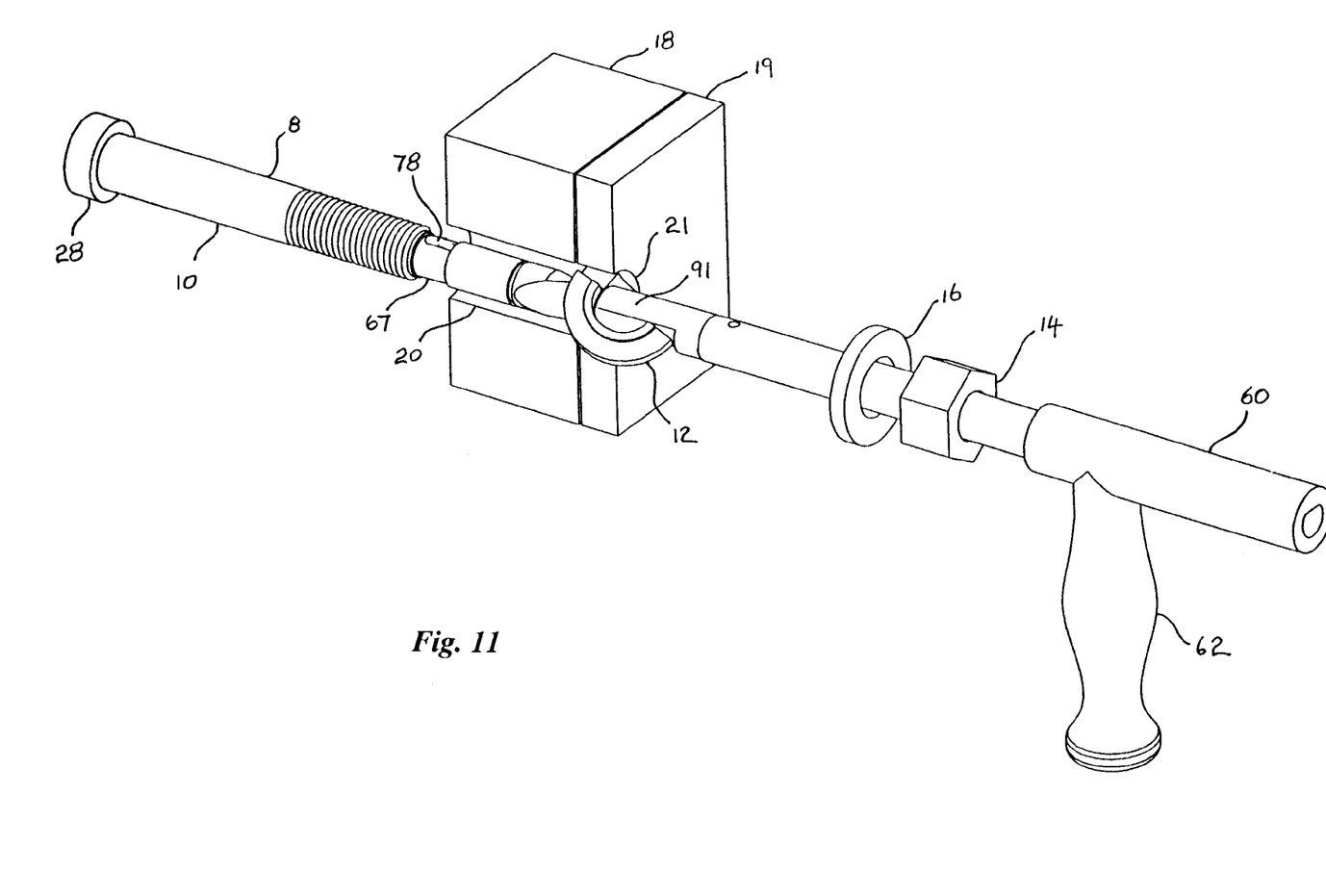
FIG. 11 is a cut away view of the fastener assembly of FIG. 1, shown in the process of installation using the installation tool shown in FIG. 8.
Figure 12:
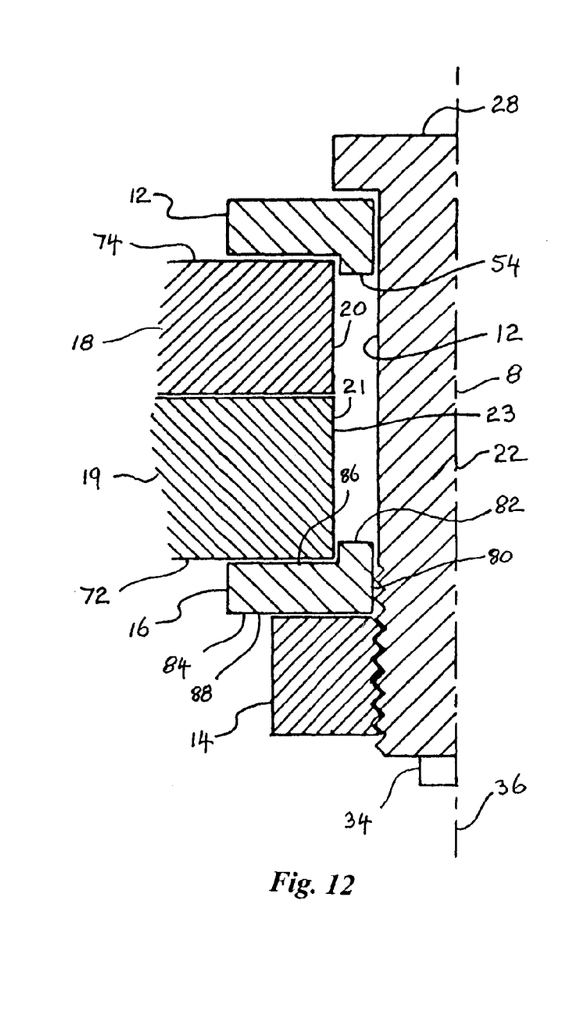
FIG. 12 is a cross section through part of an assembled fastener assembly according to the first embodiment.

Referring to FIGS. 1 to 12, a fastener assembly 6 comprises a fastener 8, a nut 14 and washer 16. The fastener 8 consists of a bolt portion 10 and a round collar portion 12. The fastener joins two steel plates 18 and 19 (together comprising a substrate) by passing through holes 20 and 21 in them and being tensioned. FIG. 12 shows a diametral half of the assembled and tensioned fastener 8 extending through the plates 18 and 19 with the collar 12, washer 16 and nut 14 engaged.

Figure 1:
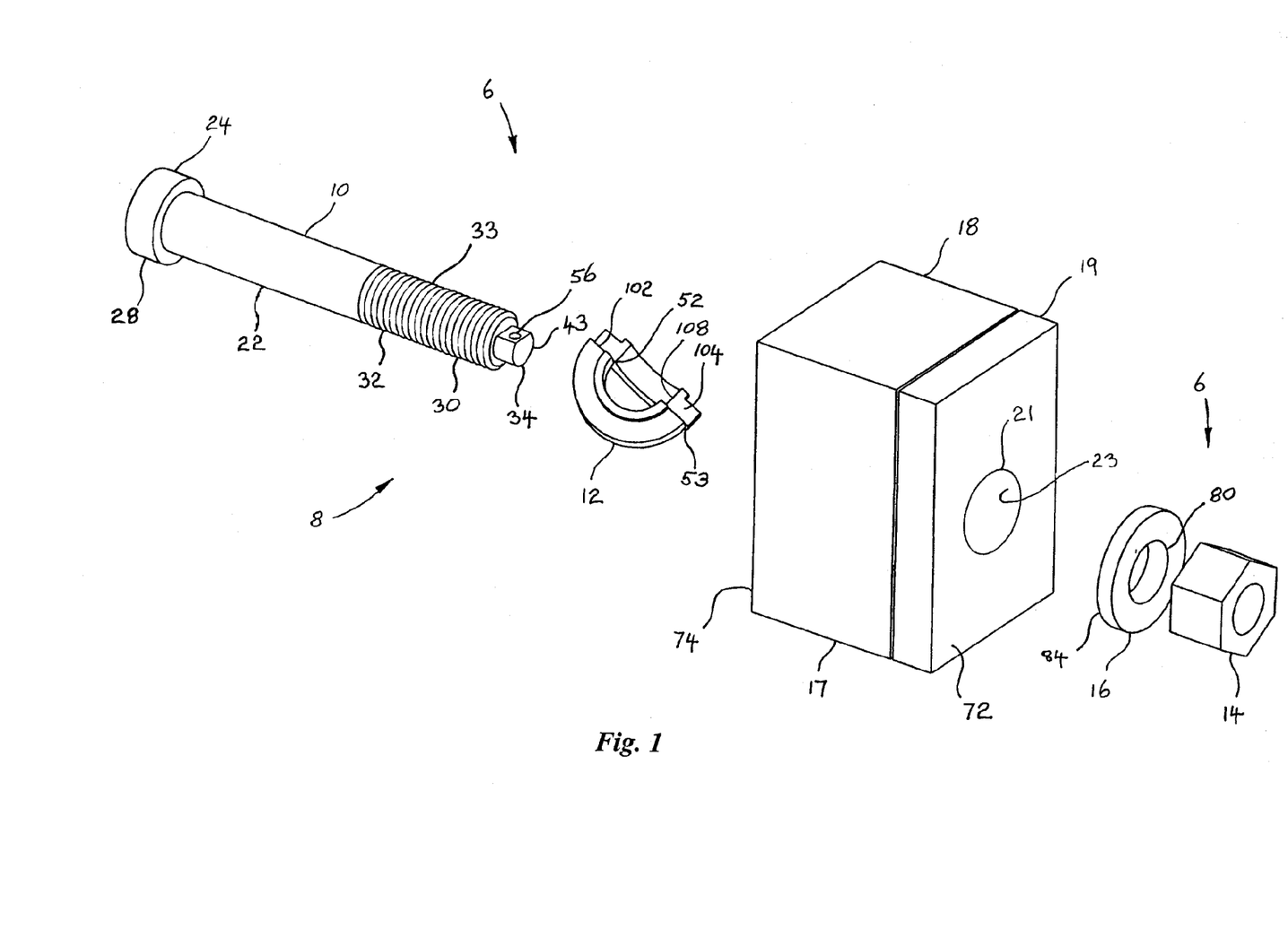
FIG. 1 is an exploded view of a fastener assembly according to a first embodiment of the present invention prior to installation.
Figure 7:
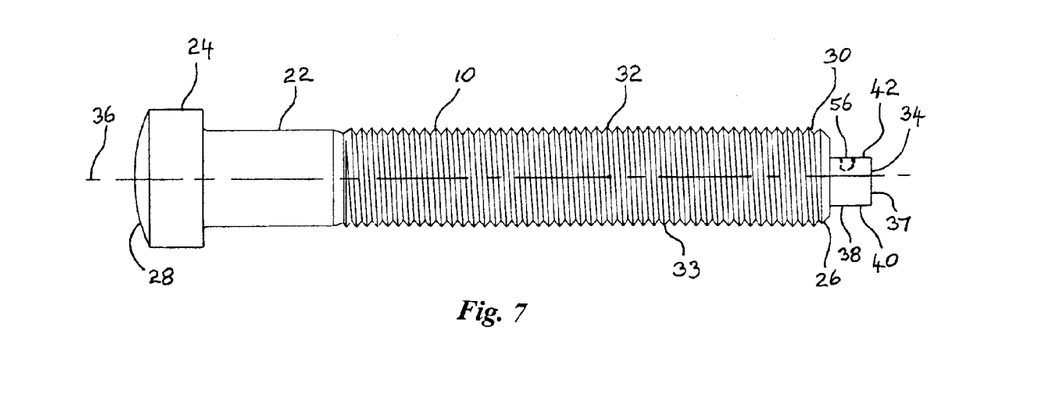
FIG. 7 is a side view of a bolt component of the fastener shown in FIG. 1.

The bolt 10 has a shank 22 with, at one end 24, an enlarged head 28 and, at the other end 26, a tail 30 which carries a thread 32 on a threaded portion 33 to suit the nut 14. The head 28 of the bolt 10 is a crown integrally formed with the shank 22. The head of the fastener 8 is thus the combination of the bolt head 28 and the collar 12. On the end of its tail 30 the bolt carries an axial protrusion 34 having a flat end face 37 and a peripheral surface 38. The peripheral surface 38 has a curved portion 40 and a flat face 42. The curved portion 40 has a cylindrical form whose axis is coincident with the major axis 36 of the bolt. The cylindrical form has a segment removed from its cylindrical shape so as to form the flat face 42 on the peripheral surface 38.

The protrusion 34 thus has a non-circular cross-section. The cross section is D-shaped when viewed as a plane transverse to the axis 36 of the bolt 12. The curved portion 40 of the peripheral surface 38 provides a circular curved edge 43 in cross section. The flat face 42 on the periphery provides flat portion 44 on the cross-section. The maximum diameter of the protrusion 34 is smaller than the root diameter of the bolt thread 32.

A short circular hole 56 forms a recess in about the centre of the flat face 42.

As best seen in FIGS. 2 to 6, the collar 12 comprises two half-collars 46 and 47 linked together by a backing strap 48. The collar 12 has a central aperture 51 forming a bore surrounded by a boss 54 and an outwardly extending flange 55 to form a stepped front face 58 and a flat rear face 50. Each half-collar 46 and 47 have corresponding respective boss portions 54a and 54b, flange portions 55a and 55b, front faces 58a and 58b, and rear faces 50a and 50b.

Figure 2:
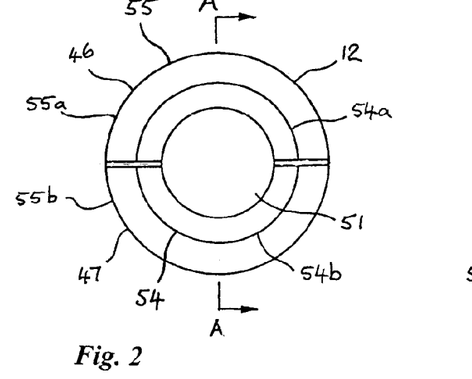
FIGS. 2 and 3 are respective front and rear views of a collar component of the fastener shown in FIG. 1.
Figure 3:
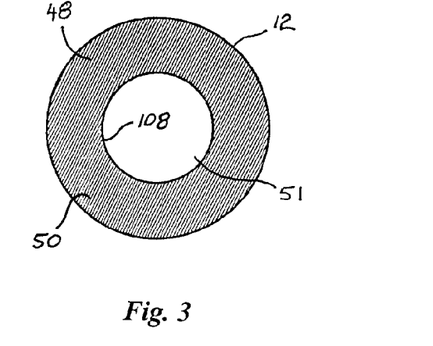
Figure 4:
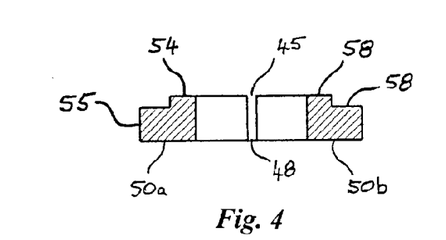
FIG. 4 is a cross section view through A-A shown in FIG. 2.
Figure 5:
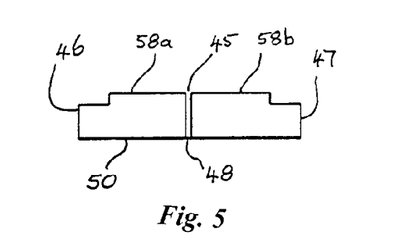
FIG. 5 is a side view looking in the same direction as in FIG. 4.
Figure 6:
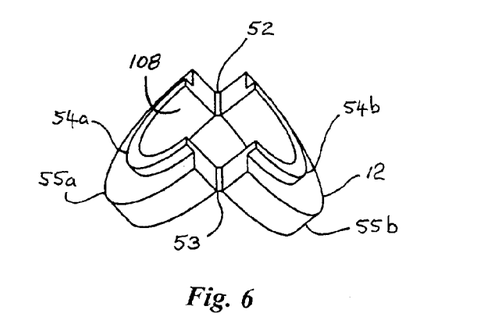
FIG. 6 shows the component of FIG. 2 folded ready for installation.

The half-collars 46 and 47 are generally made from hardened steel and the strap 48 made from a strong adhesive tape which is tightly adhered to the rear faces 50a and 50b of respective half-collars. The half-collars 46 and 47 are separated by a narrow gap 45 which is bridged by the strap 48. Thus the boss 54 and flange 55 are each discontinuous due to the gap 45 separating their halves. The strap 48 provides a pair of hinges 52 and 53 whereby the half-collars can be folded over with their rear faces 50a and 50b abutting and the boss outwards. The portion of the strap bridging the gap 45 provides a length over which the strap can bend for hinging.

The strap 48 is made of tape which has no significant resilience tending to open the collar out. In some less preferred embodiments the strap 48 may have some resilient property, but not enough by itself to fully open out the collar to the position shown in FIG. 5. In other less preferred embodiments the strap does have sufficient resilience to fully open out the collar to the position shown in FIG. 5.

The washer 16 has a shape the same as the collar 12 but without the dividing gap nor backing strap. A central aperture 80 is surrounded by an axially extending boss 82 and an outwardly extending flange 84 to form a stepped front face 86 and a flat rear face 88 on the washer.

The two half-collars 46 and 47 may be made by sawing or laser cutting a washer 16 in half, with the gap 45 being the width of the saw or laser cut. Alternatively the half-collars may be separately formed as identical components.

Referring to FIGS. 8 to 11 and 14 to 21, the additional apparatus used to install the fastener assembly 6 comprises a tool 60 having a handle 62 mounted at right angles to, and part way along, an elongate shaft 64. The handle 62 is shown pointing downwards in the Figures. The shaft 64 is generally cylindrical for most of its length, with a stepped bar portion 63 extending from its rear end 65 to a non-cylindrical collar-supporting portion 66 of the shaft 64 and a bolt engagement portion 67 of the shaft attached to the collar-supporting portion 66.

Figure 8:
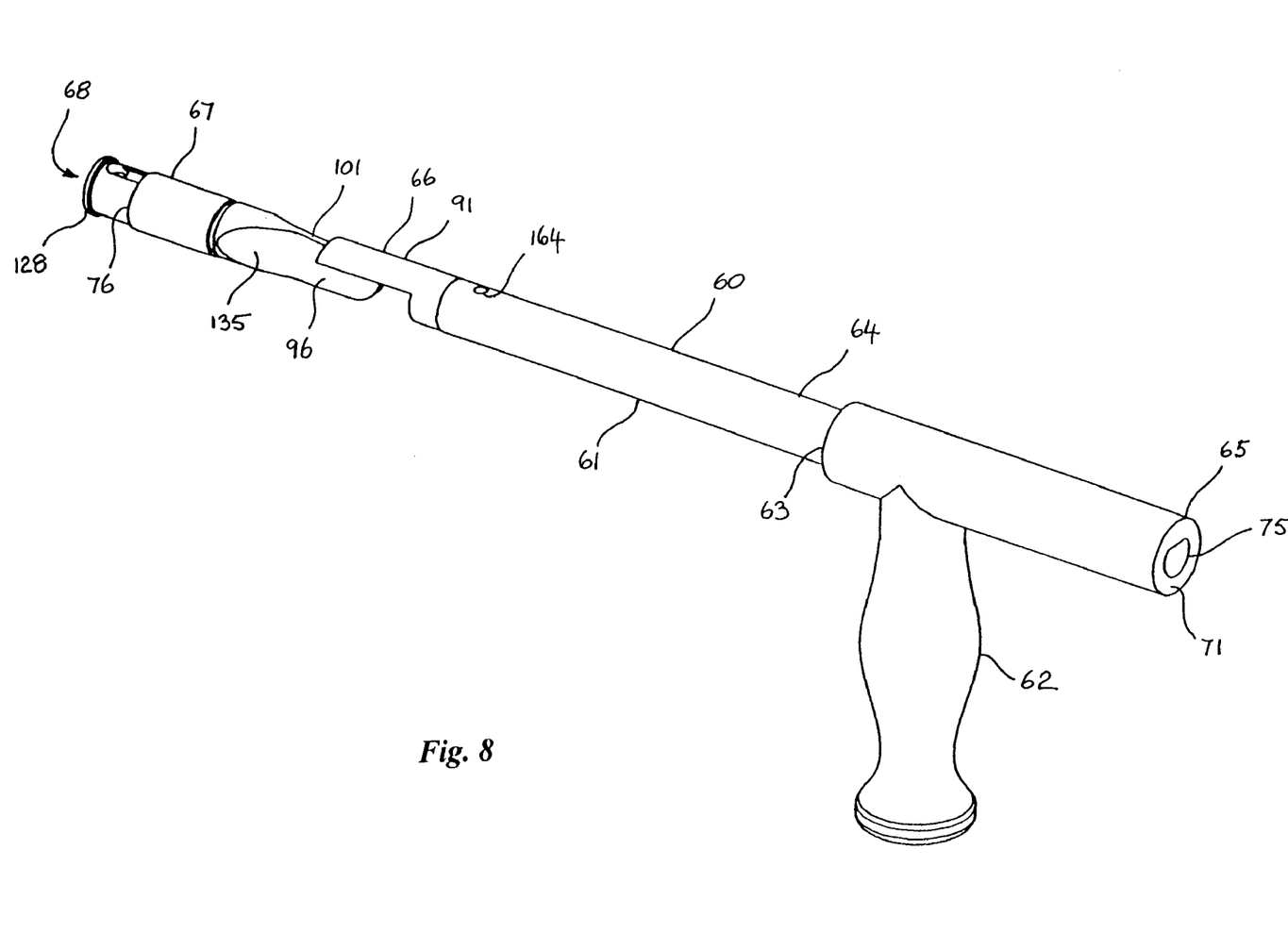
FIG. 8 is a perspective view of a tool used for installing the assembly shown in FIG. 1.
Figure 9:
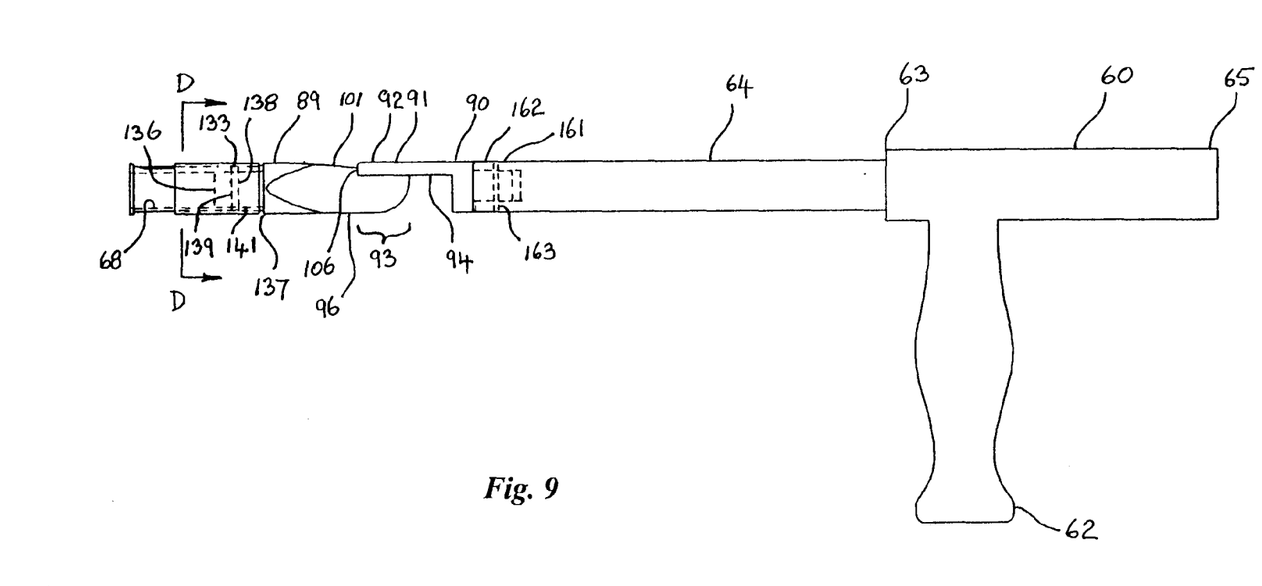
FIGS. 9 and 10 are respectively a side view and plan view of the tool in FIG. 8.
Figure 10:
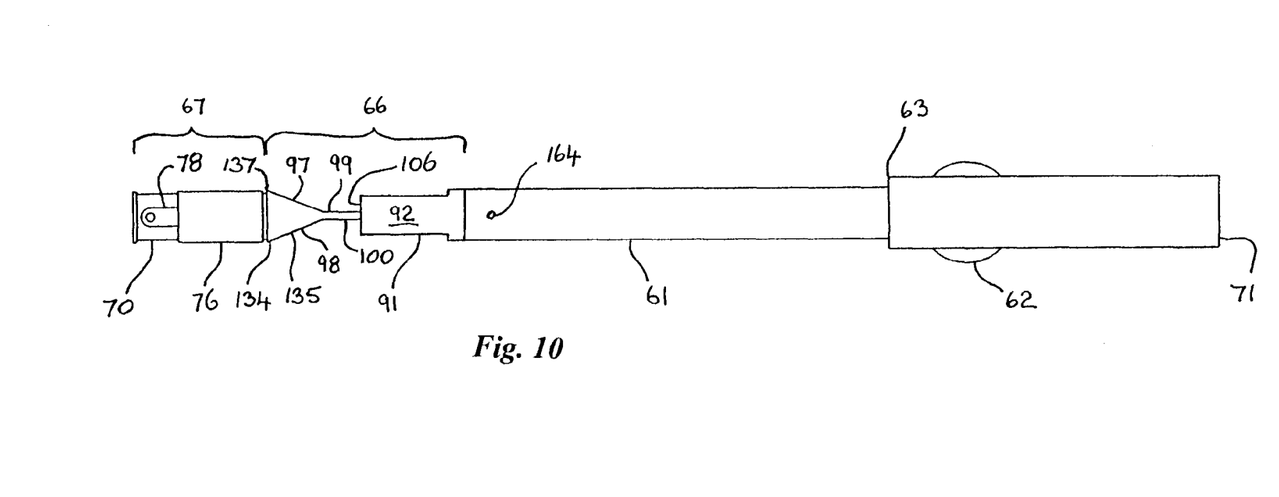

The handle 62 is adapted to be held by hand. The collar-supporting portion 66 is thinned and is described in detail below. The bolt-engagement portion 67 includes a D-shaped socket 68, on the front end 70 of the tool 60, which engages with the D-shaped protrusion 34 on the bolt. The bolt-engagement portion 67 also includes a manually moveable sleeve 76 and a latch 78 held captive by the sleeve 76.

The collar-supporting portion 66 has a forward end 89 attached to the bolt-engagement portion 67 and a rearward end 90 attached to the cylindrical portion of the shaft 64. The collar-supporting portion is thinned in two ways. Towards its rearward end 90 it has a first thinned portion 91 which is merely a flattened peripheral portion of the overall cross section of the shaft and has a curved upper face 92 and a flat lower face 94. The second thinned portion 96, which is towards the forward end 89, is waisted. The second thinned portion 96 is a thin flat portion positioned along a diameter of the shaft, and with its main faces 99 and 100 oriented vertically when the handle 62 is pointed downwards, and a top edge 101 which is stepped inwards from the upper face 92 of the first thinned portion.

The first and second thinned portions 91 and 96 overlap along a portion 93 of the collar-supporting portion 66 around the middle of the collar-supporting portion. Towards the leading end 134 of the collar-supporting portion 66, the collar-supporting portion is smoothly flared out over a tapered transition region 135 by side faces 97 and 98 which extend from the diametrically aligned thin waisted portion 96 to the full diameter of the shaft at the shoulder 137. The side faces 97 and 98 are flat in this preferred embodiment, but may be curved if desired.

In FIG. 11, the fastener 8 is shown being installed through two steel plates 18 and 19 by a person who has access to only the near side 72 of the plates. Holes 20 and 21 have been drilled in the plates 18 and 19 and, upon installation, the fastener 8 will pass through those holes and clamp the plates firmly together.

To install the fastener assembly 6, the nut 14, washer 16 and collar 12 are first fed in that order onto the shaft 64 of the tool. The stepped front face 86 of the washer faces the front face 58 of the collar. The protrusion 34 on the bolt 10 is then clipped into the socket 68 and the sleeve 76 is adjusted to engage the latch 78 with the protrusion 34, and thereby prevent the protrusion from slipping out of the socket. That engagement of latch and protrusion is described later in this specification. The bolt 10 is then fed head first through the aligned holes 20 and 21 from the near-side 72 to the far side 74 of the plates while at the same time manually positioning the collar 12 on the collar supporting portion 66 of the shaft 64. The head 28 of the bolt is a loose clearance fit through the holes 20 and 21. The bolt passes fully through the holes using the tool 60 to support it on the far side 74.

The collar is folded to hinge at 52 and 53 along the backing strap 48 and is positioned on the collar-supporting portion so that the hinge 52 spans and is supported by the thin upper edge 101 of the diametrically aligned waisted portion 96, the strap on the rear faces 50a and 50b lays substantially flat against side faces 99 and 100, and the end faces 102 and 104 of the half-collars and the hinge 53 are pressed into contact with the lower face 94 of the flattened peripheral portion 91. Portions 46 and 47 of the collar thus lie on respective opposite sides of the tool and the collar spans the overlap portion 93. The folded collar is thereby aligned to be pushed through the holes 20 and 21 by the tool when the collar supporting portion 66 is pushed through the holes. The leading edge 106 of the peripheral portion 91 presses on the inside wall 108 of the bore 51 of the collar to push the collar through the holes. At this stage the collar is collapsed from its fully opened out condition to a configuration which has a total height of about half its full diameter.

When the collar 12 emerges completely on the far side 74 of the plates, the hinge 53 drops a little but the collar continues to hang from the hinge 52 with the rear faces 50a and 50b resting against or closely adjacent to the side faces 99 and 100 of the waisted portion 96. The handle 62 is then pulled to draw the collar supporting portion 66 of the tool back into the hole, thus causing the plate 18 to push the collar along the tapered transition region 135 to thereby unfold the collar 12. Rotation of the tool through 90° before pulling the handle back causes one of the half-collars 46 and 47 to drop, thereby partly opening the collar before it slides along the transition region 135, and thus requiring less force pulling on the handle to fully open the collar. Pulling the handle back further draws the shank 22 of the bolt back into the hole, with the head 28 pressing on the collar 12 to fully open the collar and thereby assemble the fastener 8.

The half-collars 46 and 47 each carry a respective boss portion 54a and 54b on the front faces 58a and 58b adjacent the bore 51. These curved boss portions create a discontinuous boss 54 on the collar when the fastener 8 is assembled in use. The thickness of each boss portion in the diametrical direction is slightly less than the clearance between the shank 22 of the bolt and the wall 23 of the hole. The collar 12 is thus able to take up the position shown in FIG. 12 where the boss 54 serves to prevent the collar and the bolt from moving laterally relative to the hole.

The hinges 52 and 53 lie almost parallel to the axis 36 as the collar 12 is pushed through the holes while on the collar-supporting portion 66. Only the thickness of the peripheral portion 91 of the tool prevents completely parallel alignment of the hinges with the axis. The ability to nest the collar onto the tool with the collar's hinges aligned more parallel to the axis 36 when compared with the prior art allows the diameter and/or thickness of the collar to be increased for any given diameter hole through the substrate.

The washer 16 and nut 14 are then engaged with the thread 11 and tightened by hand. The bolt is then released from the socket 68 and the nut is tightened to the desired tension using a spanner or power wrench as desired.

As shown most clearly in FIG. 12 the washer 16 has its boss 82 extending from the front face 86 in contact with the steel plate 19. The outside diameter of the boss 82 is slightly smaller than the diameter of the hole 21, so the boss fits neatly into the entry of the hole 21 and thus serves to positively locate the shank 22 central to the hole in the same manner as the boss 54 on the collar 12 act in relation to the hole 20.

The rear end 71 of the shaft 64 has a D-shaped socket 75 formed therein which may be used to restrain the bolt 10 from turning while the nut 14 is being tightened.

The collar shown folded in FIG. 2 is oriented so that at the completion of installation the backing strap 48 finishes being pressed between the bolt head 10 and the rear faces 50a and 50b of the half-collars.

The tool 60 as described above is entirely of metal construction, although it may alternatively be constructed entirely from appropriately chosen engineering plastics material(s). The portions 61, 66 and 67 are socketed onto each other using socket joints 141 and 161 which are each fastened by respective pins 138 and 164 inserted through diametrical holes 133 and 163 drilled through the socket joints. The bolt-engagement portion 67 and collar supporting portion 66 may thus be conveniently replaced if worn or damaged.

The mechanism for fastening the bolt to the tool will now be described with particular reference to FIGS. 11 and 14 to 21. The bolt engagement portion 67 comprises a tubular body portion 110 which has a bore 111 with a D-shaped cross-section and has a wall 116 of non-uniform thickness. A leading end 112 of the body portion 110 has an outwardly extending flange 128 around its perimeter. The inboard end 112 of the portion 110 is fastened by socket joint 141 to the collar supporting portion 66. The curved face 114 of the bore 111 is on a portion of the wall 116 which is thinner than the portion 118 which forms the flat face 120 in the bore 111.

Figure 14:
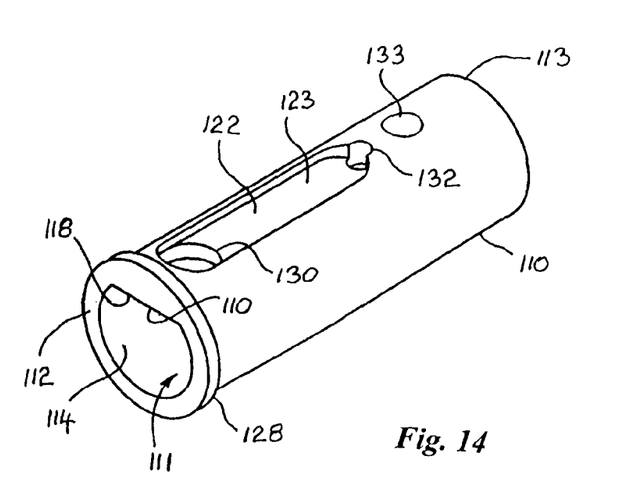
FIG. 14 is an isometric view of a bolt-holding component of the tool shown in FIG. 8.
Figure 15:
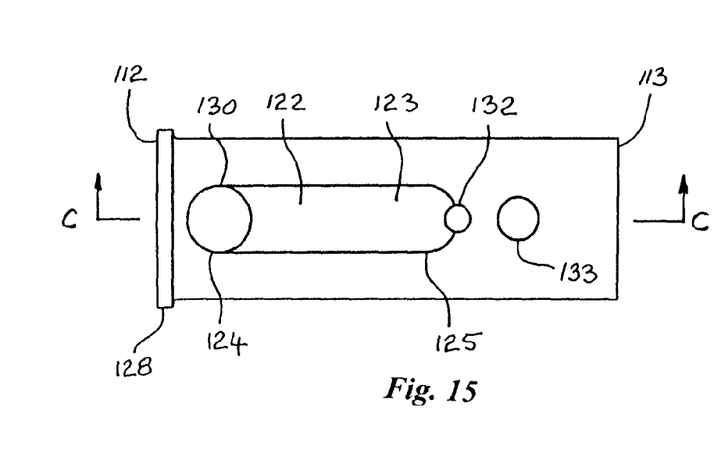
FIG. 15 is a plan view of the component shown in FIG. 14.
Figure 16:
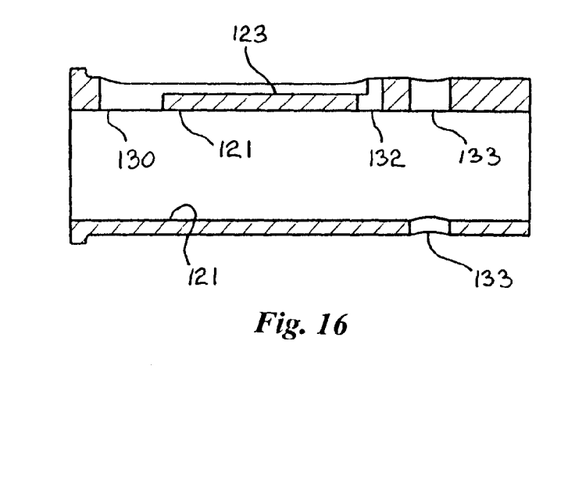
FIG. 16 is an axial cross section view through C-C shown in FIG. 15.
Figure 17:
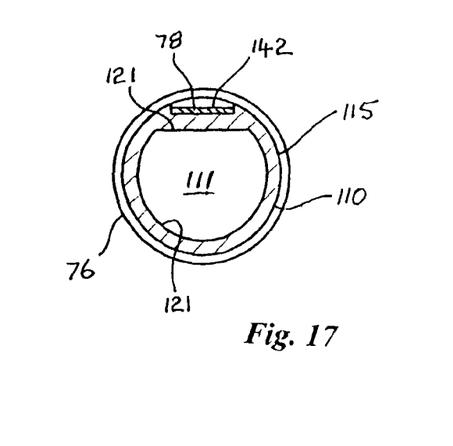
FIG. 17 is a cross section view through D-D shown in FIG. 9.

Into the thicker walled portion 118 is cut from the outside of the tube 110 an elongate channel 122 having a flat bottom 123 and rounded ends 124 and 126. The end 124 closest the leading end 112 of the tube has a hole 130 extending radially through the wall 118 into the bore 111, the diameter of the hole 130 being the same as the width of the channel 122. The inboard end 126 of the channel, which is that end closest the handle 62, has a smaller hole 132 extending from the channel radially into the bore 111.

Further towards the inboard end 113 of the tubular body portion 110 is a hole 133 diametrically completely through the tube. The leading end 134 of the collar-supporting portion 66 has a protuberance 136 which neatly fits into the D-shaped bore at the inboard end 113 to form the socket joint 141. A shoulder 137 is formed on the collar-supporting portion where the collar-supporting portion expands from the protuberance 136 to the circumferentially outer surface of the leading end 134. A circular pin 138 forming an interference fit through the hole 133 and a corresponding hole 139 through the protuberance 136 fastens the tubular body portion to the collar supporting portion.

A similar socket joint 161 joins the collar-supporting portion 66 to the main body 61. However joint 161 is formed by a cylindrical protrusion on the collar-retaining portion engaging with a socket 162 on the main body portion and retained by a pin 164 through a diametrical hole 163. The pin 164 is selected to break, thus allowing the joint 161 to rotate, if the torque on the joint exceeds a value somewhat less than that required to damage thinned portions 91 and 96.

Figure 18:
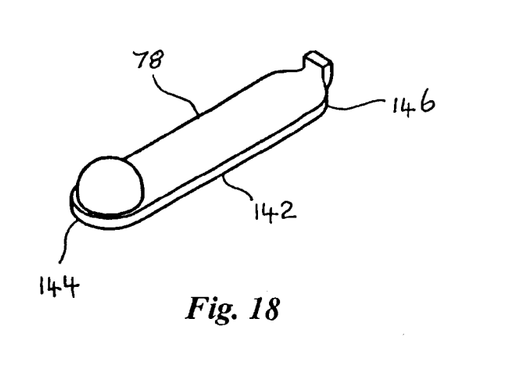
FIG. 18 is an isometric view of a retaining clip component of the tool shown in FIG. 8.
Figure 19:
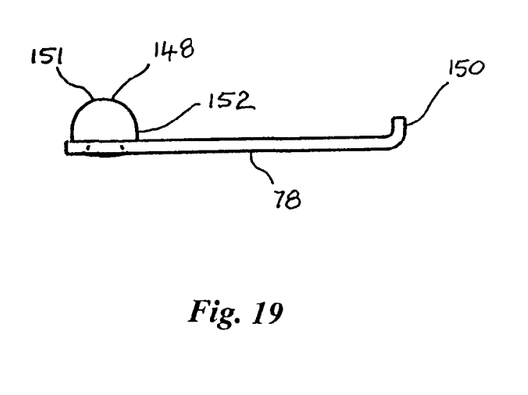
FIG. 19 is a side view of the component shown in FIG. 18.
Figure 20:
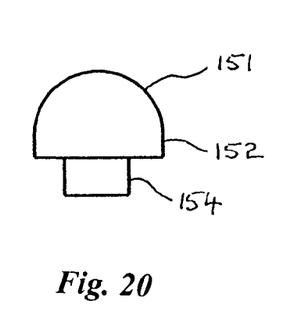
FIG. 20 is a side view of a stud component of the retaining clip shown in FIG. 18.
Figure 21:
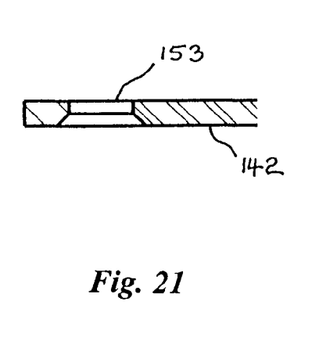
FIG. 21 is a cross section view of part of the retaining clip shown in FIG. 18 prior to its assembly.

The retaining clip 78 shown in FIGS. 18 and 19 forms a latch in the bolt-engagement portion 67. The body 142 of the latch 78 is an elongate flat strip of metal having rounded ends 144 and 146 termed the latching end and the retained end respectively. On the latching end 144 is a hemispherically-ended stud 148, while at the retained end 146 of the latch 78, the strip metal of its body 142 is narrowed and turned at right angles to extend as a narrow tab 150 in the same direction as the stud 148. The stud has a hemispherical end 151 rising from a short cylindrical portion 152. The length of the cylindrical portion 152 is about the same as the length of the hole 130. The body 142 of the latch has a hole 153 therethrough into which a tail 154 of the stud 148 is expanded in order to fasten the stud 148 to the body 142.

In use, the latch 78 is located with its body 142 resting in the channel 122, its stud 148 extending inwards into the larger hole 130 and the tab 150 extending inwards into the smaller hole 132.

While the tab 150 is not long enough to project past the flat face 120 into the bore 111, the stud 148 acts as a moveable member which is long enough to extend into the bore when depressed but nevertheless short enough to withdraw from the bore.

The thin-walled tubular sleeve 76 is held captive on the outside of the tubular body portion 110 such that the sleeve is free to slide backwards and forwards along the length of the tubular body portion and also slide around it. The sleeve is held captive by the outwardly extending flange 128 at the leading end 112 and, at the inboard end 113 by the shoulder 137 on the collar-supporting portion.

The thickness of the body 142 of the latch is such that when the sleeve 76 slides forwards to the leading end 112, the stud 148 is held down at maximum projection in the hole 130 and the hemispherical end 151 protrudes from the flat wall 118 inside the socket and engages into the recess 56 in the bolt. However when the sleeve slides back to the inboard end 113 (the position shown in FIG. 11), the latch may tilt lengthways so that the stud 138 retracts through the flat wall 118 of the socket, thus disengaging from the hole 56, and the protrusion 34 is then free to slide out of the socket 68.

Even when the sleeve 76 is withdrawn to its position back against the collar supporting portion, as seen in FIGS. 8 to 11, the latch cannot be removed from the channel 122 because the sleeve still covers the retained end 146 of the latch so that the tab 150 is held captive (although with some limited movement) within the hole 132.

Thus, in order to attach the tool 60 to the bolt 10, the sleeve 76 is slid back towards the handle of the tool and the protrusion 34 on the bolt is slipped into the socket 68. This forms an interface 121 between the flat faces 42 and 120 and between the curved faces 40 and 114. The sleeve 76 is then slid forward so depressing the stud across the interface 121 and into the recess 56. The body 142 of the latch is prevented from moving radially outwards by the sleeve 76. The stud mechanically locks the bolt to the socket. The bolt at this stage cannot be pulled from the socket without something breaking or irreversibly distorting. This constitutes a positive location of the head of the stud into the recess and does not depend upon any spring loading mechanism.

Typical nominal dimensions for a fastener used with 30 mm diameter holes in the steel plates 18 and 19 would be:

| | |
|---|---|
| diameter of bolt crown: | 29 mm |
| diameter of bolt shank: | 20 mm |
| inside diameter of collar and washer: | 21 mm |
| outside diameter of collar and washer: | 42 mm |
| thickness of flange on collar and washer: | 6 mm |
| depth of bore in collar and flange: | 8 mm (including height of boss) |
| height of boss rising from flange: | 2 mm |

It will be understood that these are nominal sizes and allowance must be made for appropriate clearances and tolerances.

Figure 13:
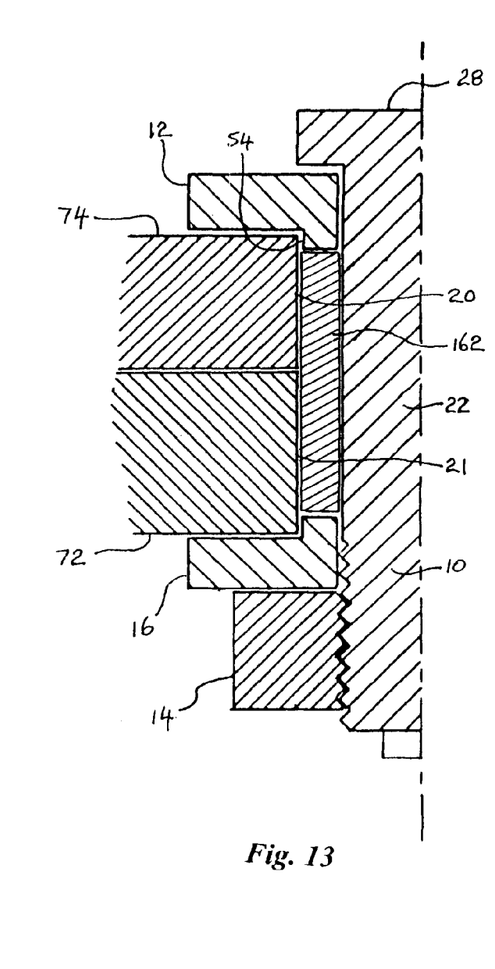
FIG. 13 is a cross section similar to FIG. 12 but through part of an assembled fastener assembly according to a second embodiment of the invention.

FIG. 13 shows a second embodiment of the invention which is preferred for joins under high shear loading. A sleeve 162 is fed onto the shaft 64 of the tool between the collar and the washer and is pressed along over the shank 22 of the bolt into the holes 20 and 21.

The sleeve 162 is sized so that the sum of its length plus the heights of the bosses on the collar and washer is a little shorter than the total length through the plates 18 and 19, so that the sleeve substantially fills the annular gap lengthwise but is not axially compressed during tightening of the nut 14. The inside and outside diameters of the sleeve 162 are selected to be a loose (but not sloppy) sliding fit to the bolt 10 and the holes 20 and 21 respectively. The sleeve 162 thus neatly fills the annular gap between the bolt and the walls of the holes 21 and 22, so there can be no significant movement lateral to the hole. The bosses on the collar and washer are typically a little looser fit than the sleeve 162 into the holes.

A sleeve applied to the example fastener dimensioned above would have a nominal internal diameter of 20 mm and outside diameter of 29 mm. For joints under high shear, this is equivalent to having a fastener with a 29 mm shank through the 30 mm hole. For a cost-effective greater increase in shear strength of the fastening, a higher strength steel may be used for the sleeve than is used for the bolt. If there is little or no shear component to the loading, then the sleeve may be omitted from the assembly if required as shown in FIG. 12.

While less preferred versions of the invention may utilise a spring loaded mechanism for urging the stud into the recess, the positive fastening provided by the above described embodiment is preferred.

Figure 22:
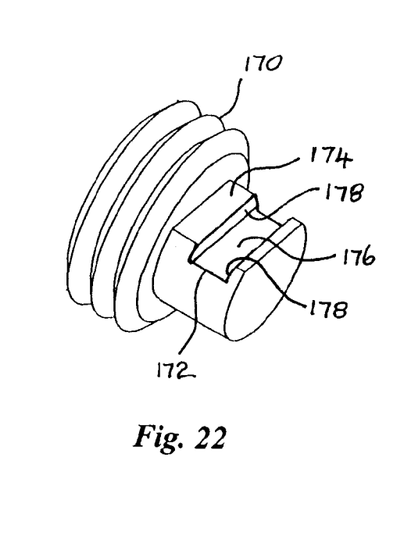
FIG. 22 is a view of the end of the tail portion of an alternative configuration of a bolt component utilised in the invention.

A preferred alternative configuration of the recess in the protrusion is shown on the bolt 170 in FIG. 22. The bolt 170 works with the same tool 60 as described above. However whereas the recess previously described is a circular hole 56, the recess in FIG. 22 is a slot 172 formed across the flattened face 174. Such a slot can be formed in the same operation as that which machines the flattened face 174 and thus a further drilling operation to make the hole is not required.

It is to be understood that various alterations, modifications and/or additions may be introduced into the constructions and arrangements of parts previously described without departing from the spirit or ambit of the invention. For example whereas the slot 172 shown in FIG. 22 has a rectangular cross section with a flat bottom 176 and flat side walls 178, the slot may alternatively have a cross section which is semi-circular, V-shaped, or any other shape which provides a positive interlock with a correspondingly shaped mating stud on the latch 78.

Also, in some alternative embodiments of the invention, the nut 14 and washer 16 are combined into a single item such that the nut has a boss corresponding to boss 82 which in use engages into the hole 21 as the nut is tightened.

Also, in some alternative embodiments of the invention, the collar supporting portion 66 is welded to (or otherwise integrally formed with) the leading end of the main body portion 61 of the tool rather than having pinned socket joint 161. Similarly the collar-supporting portion 66 may be welded to (or otherwise integrally formed with) the bolt-engaging portion 67 rather than having the pinned socket joint 141.

Also, in some less preferred embodiments of the invention the protrusion 34 and engaging socket have simple cylindrical forms so that, unless the stud is engaged into the recess, the protrusion is free to rotate in the socket.

Throughout this specification, unless the context requires otherwise, the word "comprise", and variations such as "comprises" and "comprising", will be understood to imply the inclusion of a stated feature or group of features but not the exclusion of any other feature or group of features.

The invention claimed is:

1. A method of installing a threaded fastener from one side of a hole through a substrate, said fastener comprising:
   (a) a bolt having:
      (i) an enlarged head portion at one end,
      (ii) a threaded tail portion at the end opposite said head, and
      (iii) a tool engagement portion extending from said threaded tail portion, and
   (b) a washer-like collar having an aperture therethrough, said method comprising:
   (a) engaging said tool engagement portion with a bolt engagement portion of a tool,
   (b) passing said bolt completely through said hole head first from said one side, being the near side of said hole, to the far side of said hole,
   (c) supporting said bolt on said far side of said hole by way of said tool which is extending through said hole,
   (d) passing said collar completely through said hole while supporting said collar with said tool extending through said aperture and through said hole, said collar being collapsed with portions of said collar lying on respective opposite sides of said tool as said collar is being passed through said hole;
   (e) causing said bolt and said collar to assemble to form said threaded fastener having a head larger than said hole on said far side of the hole, a shank within said hole, and portion of said threaded tail on the near side of said hole;
   (f) engaging a nut with said threaded tail portion on said near side and rotating said nut to tighten said fastener; and
   (g) detaching said tool from said fastener;
   wherein said bolt engagement portion and said tool engagement portion engage along an interface, and separation of said bolt engagement portion and said tool engagement portion is prevented by a moveable member, which engages said bolt engagement portion and said tool engagement portion across said interface.

2. The method according to claim 1 wherein said bolt engagement portion and said tool engagement portion engage in a sliding fit along an interface aligned axially to said bolt.

3. The method according to claim 2 wherein said tool engagement portion and said bolt engagement portion engage by way of a protrusion sliding into a socket.

4. The method according to claim 3 wherein said tool engagement portion includes a recess and said bolt engagement portion includes a moveable member, which engages into said recess to thereby prevent said separation of said bolt engagement portion and said tool engagement portion.

5. The method according to claim 3 wherein said protrusion has a non-circular cross section so as to prevent rotation of said protrusion in said socket.

6. The method according to claim 5 wherein said non-circular cross section has a straight portion, such that said protrusion has a flattened face on its periphery.

7. The method according to claim 6 wherein said recess is formed into said flattened face.

8. The method according to claim 7 wherein said recess is a circular hole.

9. The method according to claim 7 wherein said recess is a slot formed across said flattened face.

10. The method according to claim 5 wherein said non-circular cross section is D-shaped, the rounded portion of which is circular having a center, which lies on the axis of said threaded tail portion, such that said protrusion has a cylindrical face and a flattened face on its periphery.

11. The method according to claim 3 wherein said moveable member prevents rotational movement of said protrusion relative to said socket when said moveable member is engaged across said interface.

12. The method according to claim 3 wherein said tool has a handle, a shaft attached to the handle, and said bolt engagement portion affixed to one end of said shaft, said shaft including on respective portions of its length:
  a flattened peripheral portion, and
  a flattened diametrically aligned portion located between said flattened peripheral portion and said bolt engagement portion and extending towards said handle to partly overlap with said flattened peripheral portion,
and wherein as said collar is passed through said hole, said collar is supported at a first folded portion by said diametrically aligned portion.

13. The method according to claim 1 wherein said tool engagement portion comprises a protrusion extending from said threaded tail portion, said bolt engagement portion comprises a socket, and said protrusion and said socket engage in a sliding fit along an interface aligned in an axial direction relative to said bolt.

14. The method according to claim 13 wherein said protrusion includes a recess and said bolt engagement portion includes a moveable member, which engages into said recess to thereby prevent withdrawal of said protrusion from within said socket.

15. The method according to claim 14 wherein said moveable member is manually activated towards said interface into a recess of manually sliding an outer sleeve on said bolt engagement portion.

16. The method according to claim 1 wherein said moveable member is manually activated towards said interface into a recess of manually sliding an outer sleeve on said bolt engagement portion.

17. The method according to claim 16 wherein said moveable member comprises a stud on a flattened strip.

18. The method according to claim 17 wherein, when said moveable member is activated towards said interface, said outer sleeve prevents said strip from moving radially outwards relative to the threaded tail portion.

19. The method according to claim 1 wherein said tool has a handle, a shaft attached to the handle, and said bolt engagement portion affixed to one end of said shaft, said shaft including on respective portions of its length:
  a flattened peripheral portion, and
  a flattened diametrically aligned portion located between said flattened peripheral portion and said bolt engagement portion and extending towards said handle to partly overlap with said flattened peripheral portion,
and wherein as said collar is passed through said hole, said collar is supported at a first folded portion by said diametrically aligned portion.

20. The method according to claim 19 wherein, as said collar is passed through said hole, said collar is folded with portions of said collar lying on respective opposite sides of said diametrically aligned portion, said collar spans said overlap of said flattened peripheral portion and said diametrically aligned portion, and a second folded portion of said collar abuts said flattened peripheral portion.

* * * * *